US012000764B2

(12) United States Patent
Adair et al.

(10) Patent No.: US 12,000,764 B2
(45) Date of Patent: Jun. 4, 2024

(54) PLANAR GRINDER

(71) Applicant: Illinois Tool Works Inc., Glenview, IL (US)

(72) Inventors: Kurt G. Adair, Highland Park, IL (US); Charles E. Shewey, Salem, WI (US); Michael F. Hart, Mundelein, IL (US); Douglas A. Ceckowski, Gurnee, IL (US); James A. Haberstroh, Vernon Hills, IL (US)

(73) Assignee: Illinois Tool Works Inc., Glenview, IL (US)

( * ) Notice: Subject to any disclaimer, the term of this patent is extended or adjusted under 35 U.S.C. 154(b) by 782 days.

(21) Appl. No.: 16/883,968

(22) Filed: May 26, 2020

(65) Prior Publication Data

US 2020/0284700 A1    Sep. 10, 2020

Related U.S. Application Data

(63) Continuation of application No. 15/526,096, filed as application No. PCT/US2015/059832 on Nov. 10, 2015, now abandoned.

(Continued)

(51) Int. Cl.
*G01N 1/28* (2006.01)
*B24B 7/04* (2006.01)
(Continued)

(52) U.S. Cl.
CPC ............... *G01N 1/286* (2013.01); *B24B 7/04* (2013.01); *B24B 37/005* (2013.01); *B24B 37/04* (2013.01);
(Continued)

(58) Field of Classification Search
None
See application file for complete search history.

(56) References Cited

U.S. PATENT DOCUMENTS

| 1,947,662 A | 2/1934 | Robinson |
| 3,233,370 A | 2/1966 | Best |

(Continued)

FOREIGN PATENT DOCUMENTS

| CN | 102066052 | 5/2011 |
| EP | 0658400 | 6/1995 |

(Continued)

OTHER PUBLICATIONS

Int'l Search Report and Written Opinion Appln No. PCT/US2015/059832 dated Jul. 13, 2016; 20 pages.

*Primary Examiner* — Sylvia MacArthur
(74) *Attorney, Agent, or Firm* — McAndrews, Held & Malloy, Ltd.

(57) ABSTRACT

A sample grinder includes a base having a bowl and a rotatable drive plate to operably support a grinding wheel. A head is configured to support a specimen holder and has a first drive for rotational drive of the specimen holder and a second drive for moving the head and specimen holder toward and away from the drive plate. The head has a sleeve that is larger than the specimen holder. A cover is disposed over the bowl and has an opening larger than the sleeve so that the sleeve fits through the opening when the specimen holder is moved toward the rotatable drive plate. The grinding wheel is mountable to the plate in a single radial orientation only. A dressing system is operably connected to a controller to monitor the current of the drive plate motor and/or the head first drive actuates the dressing system based upon the current drawn by the drive plate motor and/or the head first drive motor falling below a predetermined value.

20 Claims, 12 Drawing Sheets

Related U.S. Application Data (60) Provisional application No. 62/078,628, filed on Nov. 12, 2014.

(51) Int. Cl.

| | |
|---|---|
| *B24B 37/005* | (2012.01) |
| *B24B 37/04* | (2012.01) |
| *B24B 37/10* | (2012.01) |
| *B24B 37/34* | (2012.01) |
| *B24B 45/00* | (2006.01) |
| *B24B 49/04* | (2006.01) |
| *B24B 49/10* | (2006.01) |
| *B24B 49/16* | (2006.01) |
| *B24B 51/00* | (2006.01) |
| *B24B 53/017* | (2012.01) |
| *B24B 53/02* | (2012.01) |
| *B24B 55/03* | (2006.01) |
| *B24B 55/04* | (2006.01) |
| *G01N 1/32* | (2006.01) |
| *B24B 37/27* | (2012.01) |

(52) U.S. Cl.
CPC .......... *B24B 37/042* (2013.01); *B24B 37/105* (2013.01); *B24B 37/34* (2013.01); *B24B 45/00* (2013.01); *B24B 49/04* (2013.01); *B24B 49/10* (2013.01); *B24B 49/16* (2013.01); *B24B 51/00* (2013.01); *B24B 53/017* (2013.01); *B24B 53/02* (2013.01); *B24B 55/03* (2013.01); *B24B 55/04* (2013.01); *B24B 55/045* (2013.01); *G01N 1/32* (2013.01); *B24B 37/27* (2013.01); *G01N 2001/2866* (2013.01)

(56) References Cited

U.S. PATENT DOCUMENTS

| | | | |
|---|---|---|---|
| 4,020,600 | A | 5/1977 | Day |
| 4,873,792 | A | 10/1989 | Linke |
| 5,131,192 | A * | 7/1992 | Cheng .................... B24B 55/06 144/252.2 |
| 5,653,623 | A | 8/1997 | Kimura |
| 5,800,254 | A | 9/1998 | Motley |
| 5,816,899 | A | 10/1998 | Hart |
| 5,931,724 | A | 8/1999 | Perlov |
| 6,139,677 | A | 10/2000 | Togawa |
| 7,066,788 | B2 | 6/2006 | Rubin |
| D585,914 | S | 2/2009 | Hart |
| 7,988,535 | B2 * | 8/2011 | Chen ...................... B08B 15/04 451/41 |
| 8,152,603 | B2 | 4/2012 | Hart |
| 8,465,347 | B2 | 6/2013 | Hart |
| 8,574,028 | B2 | 11/2013 | Shewey |
| 9,174,324 | B2 | 11/2015 | Umemoto |
| 2002/0076838 | A1 | 6/2002 | Kojima |
| 2007/0184755 | A1 | 8/2007 | Park |
| 2009/0137190 | A1 | 5/2009 | Togawa |
| 2009/0264049 | A1 | 10/2009 | Chen |
| 2014/0134924 | A1 | 5/2014 | Shinozaki |
| 2018/0246016 | A1 | 8/2018 | Hauck |
| 2020/0284700 | A1* | 9/2020 | Adair .................... B24B 37/042 |

FOREIGN PATENT DOCUMENTS

| | | |
|---|---|---|
| EP | 0796702 | 9/1997 |
| JP | H11138418 | 5/1999 |
| JP | H11221757 | 8/1999 |

* cited by examiner

PLANAR GRINDER

CROSS-REFERENCE TO RELATED APPLICATION DATA

The present application is a continuation of U.S. application Ser. No. 15/526,096 titled "Planar Grinder" and filed on May 11, 2017, which in turn claims priority to and claims benefit from U.S. Provisional Patent Application Ser. No. 62/078,628, filed on Nov. 12, 2014. The contents of each of the above applications are hereby incorporated herein by reference in their entirety.

BACKGROUND

Grinders are in use in many industries. One type of grinder is used to prepare samples of materials such as metals, polymers, ceramics or the like for further examination, such as by microscopic examination.

Known grinders include a sample or specimen holder that is configured to rotate relative to a grinding media that is also configured to rotate. In this manner, there are two rotating motions occurring simultaneously. A fluid, such as water, is injected onto the grinding media to lubricate and cool the sample and media and to remove debris, such as grinding debris generated during the grinding process.

One known grinder/polisher, disclosed in Shewey, et al, U.S. Pat. No. 8,574,028, includes a head on which a sample holder is mounted for rotation of the sample. The sample is held against a rotating plate or platen in a base of the grinder. The plate or platen has an abrasive surface or an abrasive fluid media is introduces onto the platen to effect the sample preparation. Typically, the abrasive surface on the platen is an abrasive paper or other removable and replaceable media. The disclosure of Shewey, as well, the disclosures of Hart. U.S. Pat. No. 8,465,347 and Hart, U.S. Pat. No. 8,152,603 are commonly assigned with the present application and are incorporated herein by reference.

The head of the grinder/polisher of Shewey reciprocates (moves toward and away from the platen) to maintain a predetermined force between the sample and the platen. Reciprocating movement of the head is determined based, in part, on input from a load cell that is operably connected to the specimen holder (via a chuck and drive shaft).

When used as a grinder, a grinding wheel is mounted to the platen. In use, the abrasive particles that form the grinding wheel become worn as a result of contact with and grinding of the specimen. As a result, the grinding wheel must be "dressed" or resurfaced to continue to effectively prepare the sample. Dressing is carried out during the grinding operation using an arm that swings over an opposite side of the wheel that has a head mounted to the arm. The arm moves in an arc and contacts the wheel to remove the worn areas and expose fresh surfaces of the abrasive that more efficiently effect the grind. In known automated grinder systems, dressing is carried out on a timed basis, regardless of whether it is needed, or is overdue.

In addition, known grinders have a base in which the platen is positioned that has an open top. That is, the areas above the platen, surrounding the specimens on the holder are open to the environs. While this makes access to the wheel and/or platen and specimens readily available, it can also result in splashing and debris being ejected from the grinder during operation.

It is also common to, at times, change out wheels to carry out different grinding operations. For example, different materials to be prepared (such as steel and aluminum) may require that different types of grinding wheels (different wheel materials) be used. As such, a wheel for grinding steel may be removed and a wheel for grinding aluminum then installed in the grinder. When the steel grinding wheel is then reinstalled, it may require dressing or redressing to assure that the wheel surface is planar and normal to the specimen due to the orientation of the wheel as it is installed on the platen. Otherwise, the grind may not be flat due to high spots and low spots on the wheel relative to the specimen. This additional dressing to assure a planar surface on the wheel can be time consuming and can result in removing portions of the wheel that are not yet consumed or portions of the wheel that are still effective for grinding.

Accordingly, there is a need for an improved grinder. Desirably, such a grinder includes an automated system for dressing the grinding wheel based on need. More desirably, such a grinder includes a cover over the specimen to reduce the amount of splashing and debris ejection, but that permits ready access to the grinding wheel. More desirably still, such a grinder permits removing a grinding wheel and reinstalling that grinding wheel in such a way that the orientation of the wheel is maintained during reinstallation.

SUMMARY

A sample grinder includes a base having a bowl and a rotating drive plate to operably support a grinding wheel. A head is configured to support a specimen holder and has a first drive for rotational drive of the specimen holder and a second drive for moving the head and the specimen holder toward and away from the rotating plate. The head has a depending sleeve that has an inner outer periphery larger than the specimen holder.

A removable cover is disposed over the bowl and rotating drive plate. The cover has an opening having an inner periphery greater than the outer periphery of the sleeve, so that the sleeve traverses through the cover opening when the specimen holder is moved toward the rotating drive plate.

The cover has a top that is non-planar and slopes away, toward a front-side corner. The sleeve can be formed from a transparent or semi-transparent material.

The cover can include a fluid delivery manifold and a plurality of fluid dispensing nozzles in fluid communication with the fluid delivery manifold. The fluid delivery manifold can be formed as part of the cover and the fluid dispensing nozzles can be mounted to the cover over the fluid delivery manifold. The nozzles can be formed as openings in a plate and the plate mounted to an inside surface of the cover. The openings can be asymmetrically disposed generally along a line of the plate. A fluid delivery conduit in the base is in fluid communication with the fluid delivery manifold.

A grinding wheel has a central axis and is mountable to and coaxial with the platen. The grinding wheel mounts to the platen in a single radial orientation only and has one or more mounting elements thereon cooperating with the platen mounting elements to permit mounting the grinding wheel in the single radial orientation only. The grinding wheel is initially mounted to the platen, removed from the platen and remounted to the platen, and when the grinding wheel is remounted to the platen, it can be remounted in only the same radial orientation as initially mounted to the plate.

The platen mounting elements and the grinding wheel mounting elements can be, for example, cooperating projections and recesses. The cooperating projections and recesses can be pins and bores. The pins can be positioned on the platen and the bores formed in the grinding wheel.

In an embodiment, four pins are positioned on the platen, three of which are symmetrically disposed on the platen and the fourth pin is asymmetrically disposed on the platen relative to the three symmetrically disposed pins. The grinding wheel includes four bores positioned to cooperate with the four pins.

The sample grinder can also include a dressing system including an arm and a hardened face for contacting the grinding wheel to dress the grinding wheel. A monitor monitors the current of one or both of the drive plate motor and the head first drive. The sample grinder includes a controller.

The monitor monitors the current drawn by one or both of the drive plate motor and the head first drive, and the dressing system is actuated based upon a the current drawn by one or both of the drive plate motor and the head first drive motor falling below a predetermined value.

In an embodiment, the controller determines whether a grinder cycle has commenced, and once commenced, the controller initiates a dressing operation. When the controller determines that a dressing operation is in progress, the controller monitors and captures current data points, and when the controller determines that a dressing operation is not in progress, the controller determines the predetermined current value for the drive plate motor and/or the head first drive.

These and other features and advantages of the present invention will be readily apparent from the following detailed description, in conjunction with the claims

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying and drawings, wherein.

DETAILED DESCRIPTION

While the present device is susceptible of embodiment in various forms, there is shown in the drawings and will hereinafter be described a presently preferred embodiment with the understanding that the present disclosure is to be considered an exemplification and is not intended to be limited to the specific embodiment illustrated.

Referring now to the figures and in particular, to FIGS. 1-5, there is shown a bench top planar grinder 10. The grinder 10 includes, generally, a base 12, a head 14 and a controller 16 in communication with a control panel 18. The base 12 includes a casing 20 that encloses a rotating platen 22 and a drive system 24 for the platen 22. Referring briefly to FIGS. 9 and 10A-10C, the drive system 24 includes a drive motor 26. In a present embodiment, the motor 26 is an AC motor operably connected to the platen 22 by a drive belt 28.

The base 12 defines an upper lip 30 that forms the top edge of a bowl 32. The platen 22 is positioned in the bowl 32, above the bottom of the bowl, but below the lip 30. The bowl 32 has a generally D-shaped profile to allow access to the platen 22 for maintenance, removal and the like. A grinding wheel 34 is positioned on the platen 22. The D-shaped profile of the bowl 32 also allows ready access to the grinding wheel 34 for maintenance, removal and the like.

Figure 4:
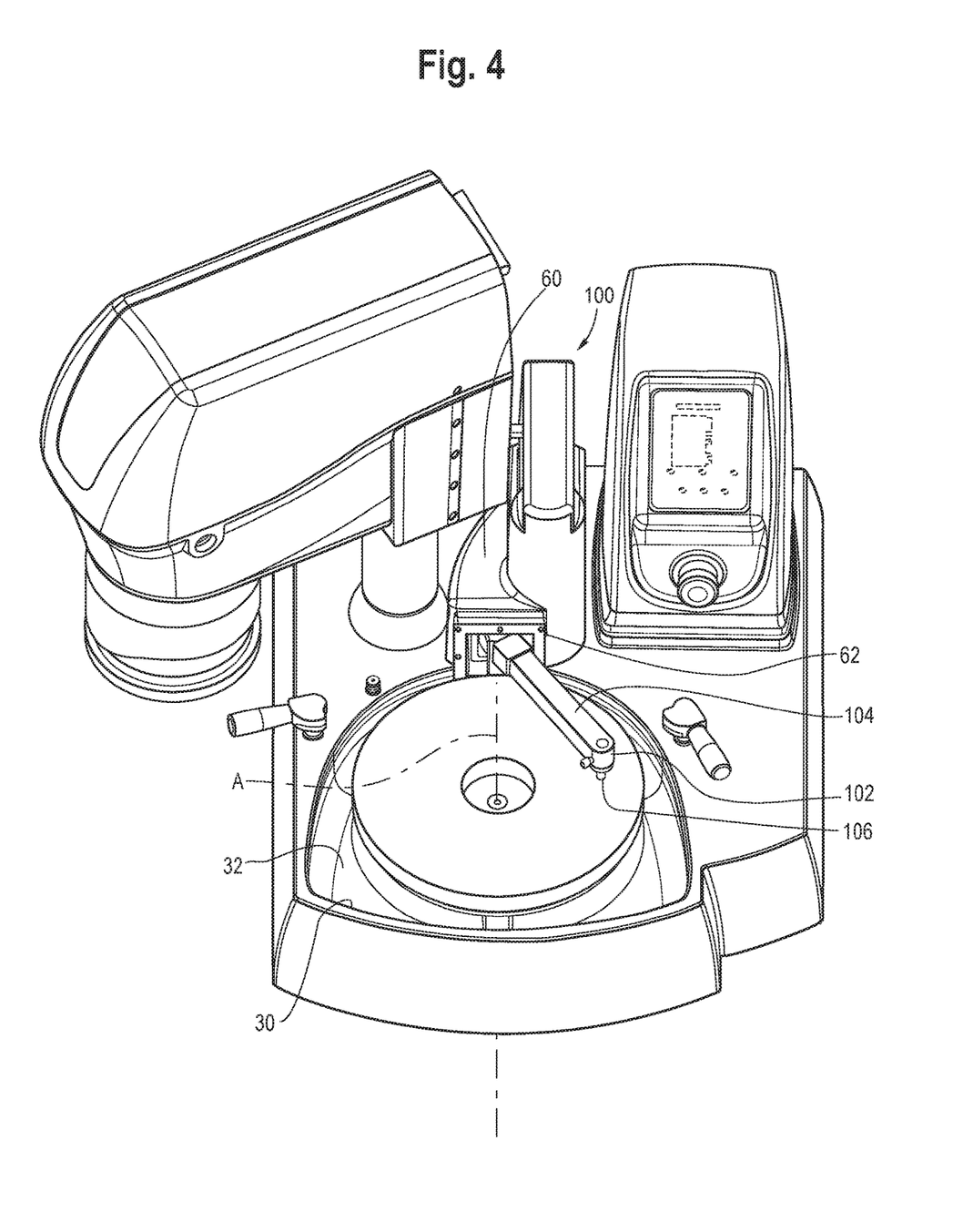
FIG. 4 is a view similar to FIG. 3 with the cover removed for ease of viewing the grinding wheel, and showing the dressing arm in an operating position on the grinding wheel.
Figure 5:
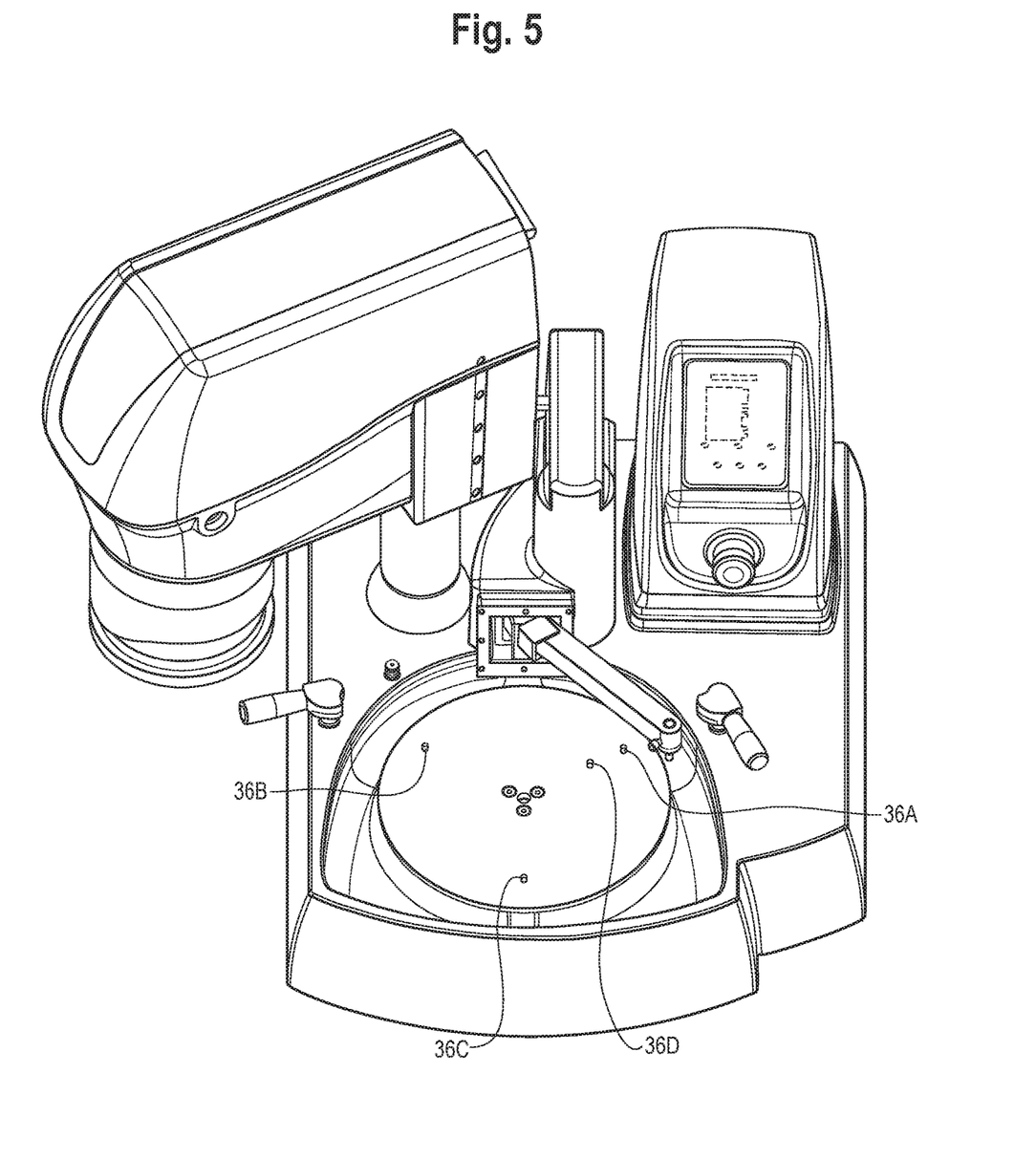
FIG. 5 is a view similar to FIG. 4 showing the grinding wheel removed for ease of viewing the platen.
Figure 14:
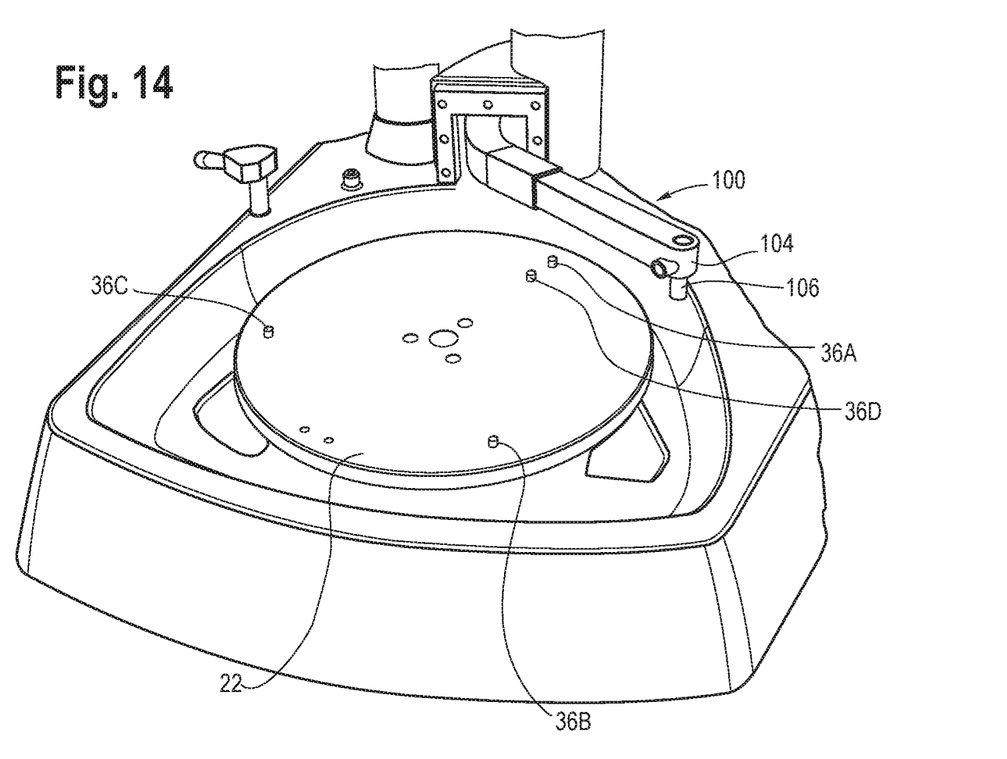
FIG. 14 is a perspective view of the base, with the cover and grinding wheel removed for clear illustration of the platen.
Figure 15:
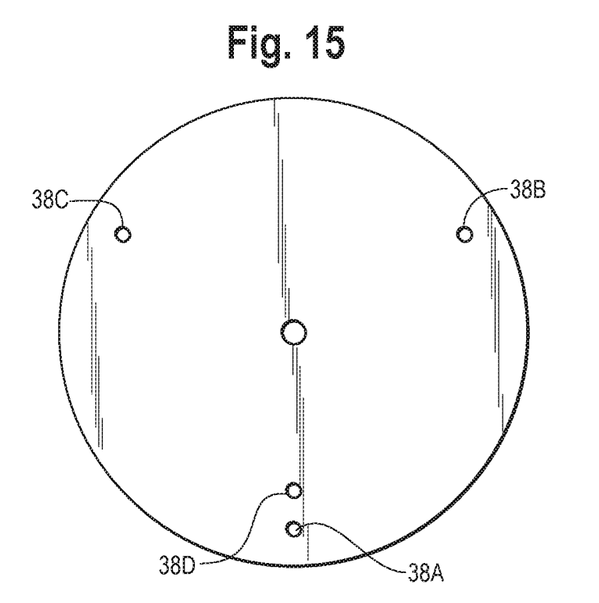
FIG. 15 is an illustration of the bottom of the grinding wheel.

Referring to FIGS. 4 and 14-15, the grinding wheel 34 is positioned on and mounted to the platen 22 for rotation with the platen 22. The grinding wheel 34 and platen 22 are coaxial with one another (that is, share a common axis A) and are configured so that the grinding wheel 34 can be installed on or mounted to the platen 22 in only one orientation. This single orientation mounting configuration assures that when the wheel 34 is removed and reinstalled on the platen 22, it is reinstalled in the exact same orientation each time. As will be appreciated by those skilled in the art, the ability to reinstall the wheel 34 at the same orientation each time eliminates the need to redress the wheel 34 each time it is installed on the platen 22.

In a present embodiment the single orientation mounting system is provided by a plurality of locating pins 36A-D, one of which 36D is asymmetrically located and which are received in cooperating locating bores 38A-D in the wheel 34, one of which 38D is asymmetrically located to receive the asymmetrically located pin 36D. For example, the wheel 34 can include three pins 36A-C located 120 degrees from one another spaced an equal distance from a center axis A of the wheel 34 and a fourth pin 36D located at any location on the wheel 34 (such as in the illustrated embodiment, along a radial line of one of the three pins), and cooperating bores 38A-D in the platen 22 for receiving the pins. Essentially, the asymmetric fourth pin 36D provides an interfering mounting arrangement to prevent installing the wheel 34 at any orientation other than the one orientation in which all four pins 36A-D will be accommodated in their respective, cooperating bores 38A-D. A single fastener 40, such as a countersunk threaded bolt can be used to secure the wheel 34 to the platen 22.

There are a number of advantages to such a single-orientation mounting arrangement. For example, as noted above, once a wheel 34 is dressed, it can be removed from the platen 22 and reinstalled without further dressing or redressing, unless it is needed to resurface the wheel 34. Moreover, the wheel 34 is readily and quickly installed, removed and reinstalled on the platen 22 with, for example, a single fastener 40.

As illustrated in FIGS. 1-4 and 11, the grinder 10 includes a cover 42 positioned over the bowl 32. The cover 42 envelops the bowl 32 (including the wheel 34) when in place. The cover 42 includes an opening 44 through which a specimen holder 46 moves to move the specimens into contact with the wheel 34. A sleeve 48 is positioned on the head 14, depending therefrom around and over a shaft 50 to which the specimen holder 46 is mounted. The sleeve 48 depends from the head 14 to a position just above the specimen holder 46.

Figure 1:
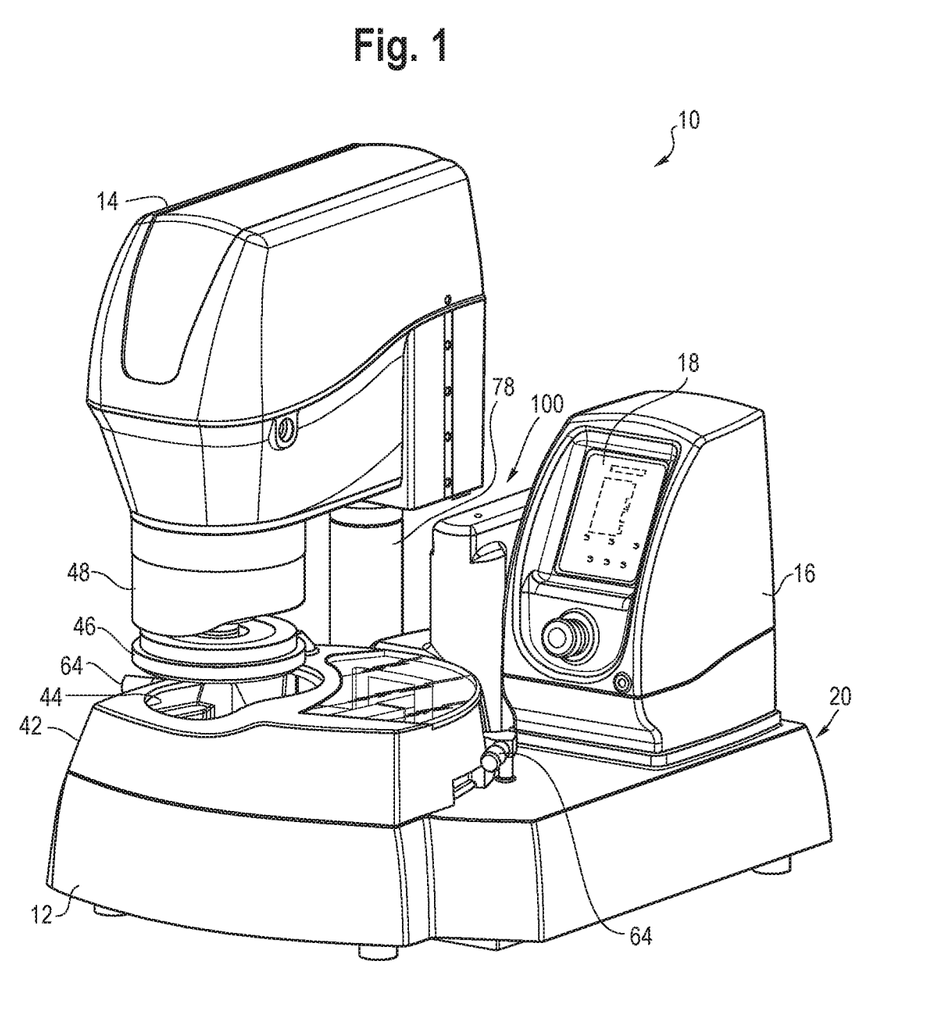
FIG. 1 is a perspective illustration of an embodiment of a planar grinder.
Figure 2:
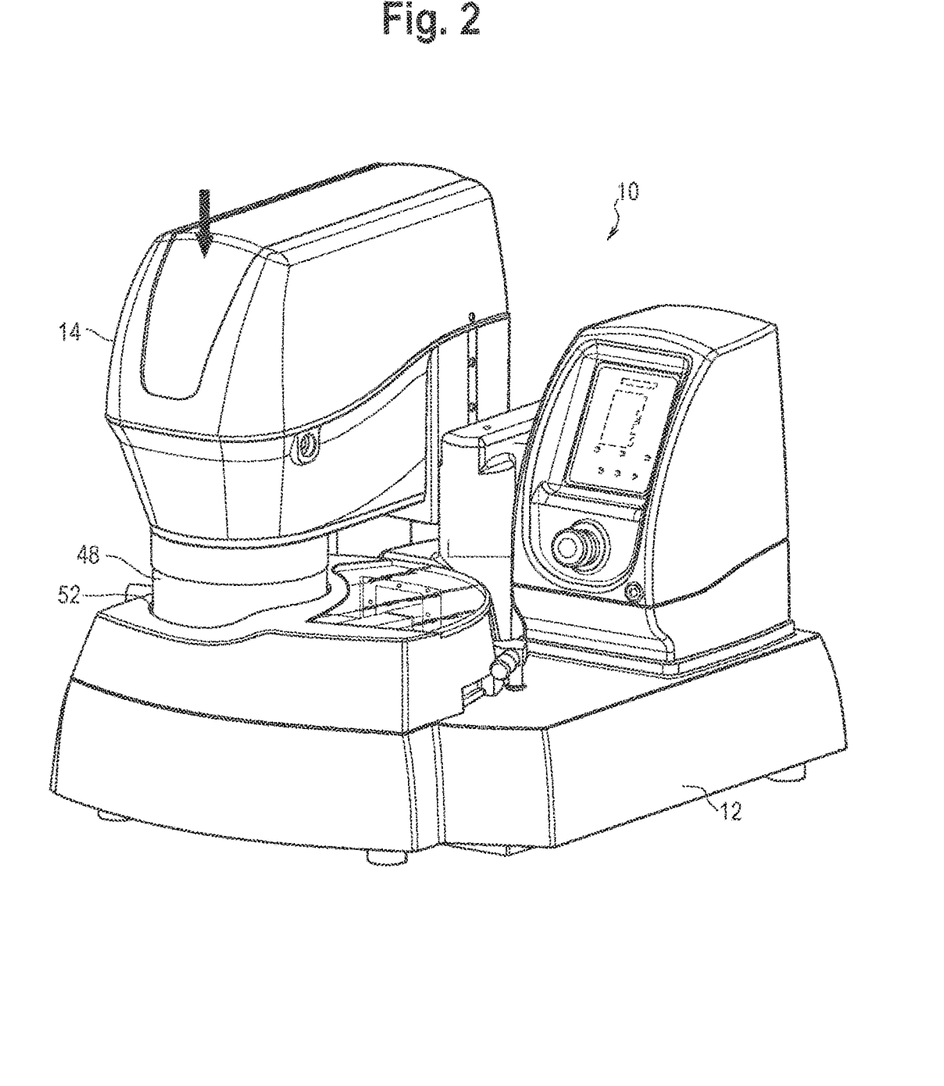
FIG. 2 is a perspective schematic illustration of the planar grinder shown with the head in the lower or grinding position.
Figure 3:
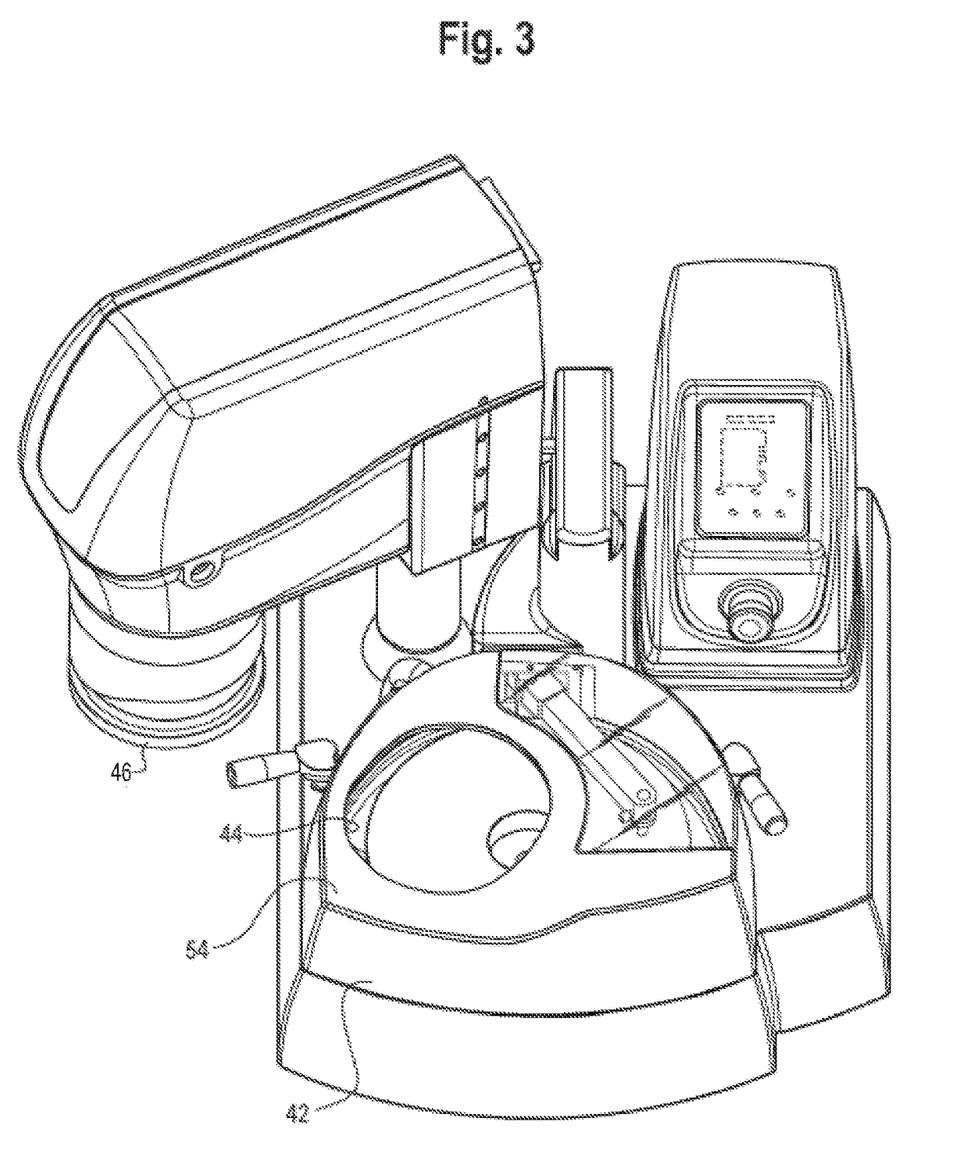
FIG. 3 is a view similar to those of FIGS. 1-2 with the head withdrawn and rotated away from the base and cover.
Figure 12:
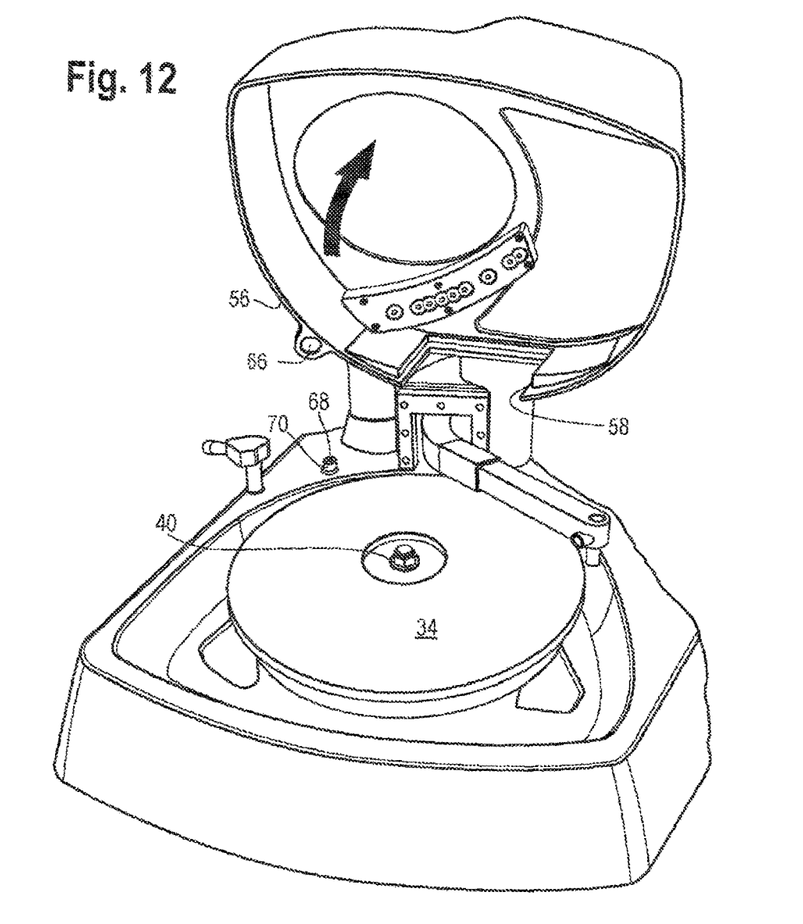
FIG. 12 is an illustration of the underside of the cover and the fluid manifold inlet and spray nozzles in the cover.

The sleeve 48 has an inner diameter that is slightly larger than the diameter of the specimen holder 46 and an outer diameter configured to allow the sleeve 48 to move through the cover opening 44 with the specimen holder 46 (the outer diameter of the sleeve 48 is just smaller than the diameter of the cover opening 44). In this manner, a gap 52 between the sleeve 48 and the cover opening 44 is sufficiently small so as to reduce or eliminate splashing that may occur. As seen in FIGS. 3 and 12, a front corner 54 of the cover 42 slopes downward to permit the head 14 (with the specimen holder 46 mounted thereto) to swing away from the cover 42 and wheel 34 for easy access to the holder 46 and wheel 34. A seal 56 can be positioned around a lower edge of the cover 42, where the cover 42 is positioned on the base 12, to further seal the bowl 32. The sleeve 48 can be formed from a transparent or semi-transparent material to permit viewing the specimen and wheel 34.

In order to access the wheel 34 and platen 22, the cover 42 is configured for easy removal from the base 12. In a present embodiment, the cover 42 includes a slotted opening 58 in a rear of the cover that is positioned over the dressing arm housing 60. The edges of the slotted opening 58 slide into a recess 62 in the dressing arm housing 60 to secure the cover 42 in place. The cover 42 can include clamps 64 that secure and lock the cover 42 to the base 12 and permit removing and installing the cover 42 without the use of tools.

When the cover 42 is in place on the base 12, an opening 66 in the cover 42 is in communication with a fluid supply conduit 68. The conduit 68 extends upwardly from the base 12 into the opening 66. A seal 70 is positioned between the conduit 68 and the opening 66. A fluid, such as water is provided from a supply, through the base 12 and into the opening 66 in the cover 42.

Figure 13:
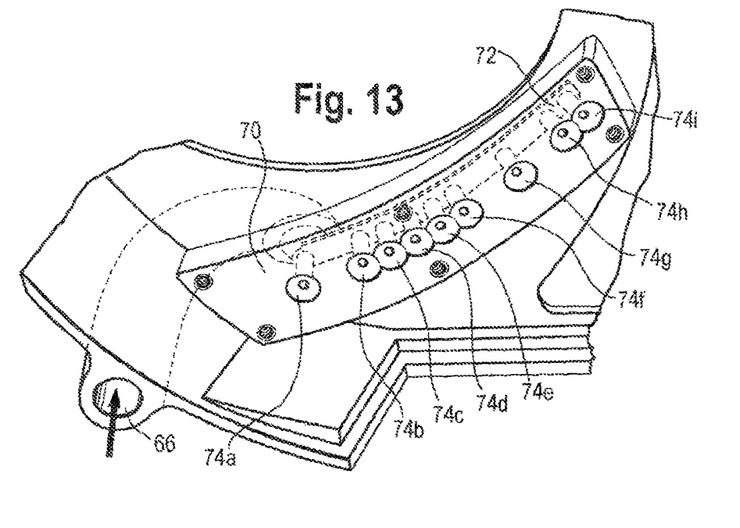
FIG. 13 is partial enlarged illustration of the fluid manifold and the fluid spray nozzles.

As noted above, a cooling/lubricating fluid is needed for proper grinder 10 operation. The fluid supply conduit 68, via a fluid delivery manifold 72 in the cover 42, supplies the cooling/lubricating fluid to the wheel 34. In an embodiment, the fluid delivery manifold 72 includes a plurality of openings or nozzles 74 that spray the fluid onto the wheel 34. The nozzles 74 are positioned to provide a desired spray pattern of fluid onto the wheel 34. In an embodiment, nine (9) nozzles 74*a*-74*i* are arranged to spray fluid from the manifold 72, with a first nozzle 74*a* near to the fluid entrance (from the conduit 68), a set of five adjacent nozzles 74*b*-74*f* spaced from the first nozzle, a seventh nozzle 74*g* spaced from the set of five nozzles, and a set of two nozzles 74*h*, 74*i* at about the end of the manifold 72, nearest to the center of the wheel 34. The nozzles 74 can be formed in a plate 76 that is positioned over and forms part of the manifold 72.

Referring to FIGS. 1-9 the head 14 supports and rotates the specimens S. The head 14 is mounted to the base 12 by a telescoping support 78. The head 14 contains two drive systems, one drive system 80 for rotation of the specimen holder 46 (see FIG. 8), and a height drive system 82 for up and down movement of the head 14 (see FIGS. 6-7) to move the specimen holder 46 and the specimens S toward and away from the wheel 34. The movements, rotational and height, are provided by the separate drive systems 80, 82.

Figure 8:
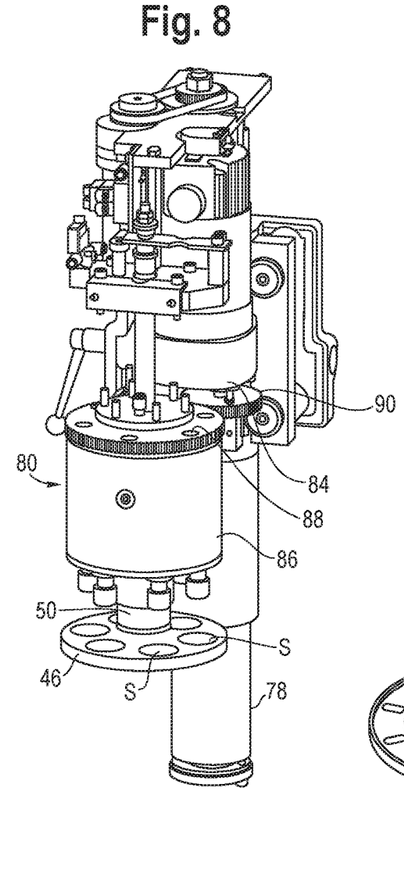
FIG. 8 is a perspective view of a portion of the specimen (rotational) drive shown with a specimen holder therein and the specimen drive assembly shaft.
Figure 9:
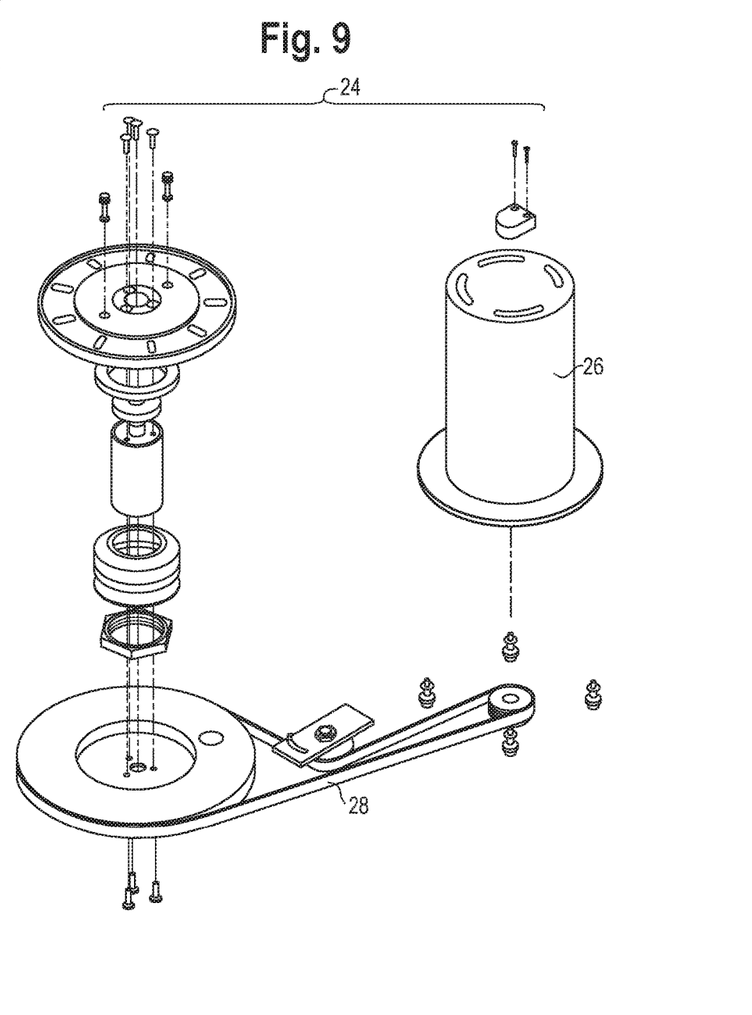
FIG. 9 is an exploded view of the platen drive and drive assembly.
Figure 10A:
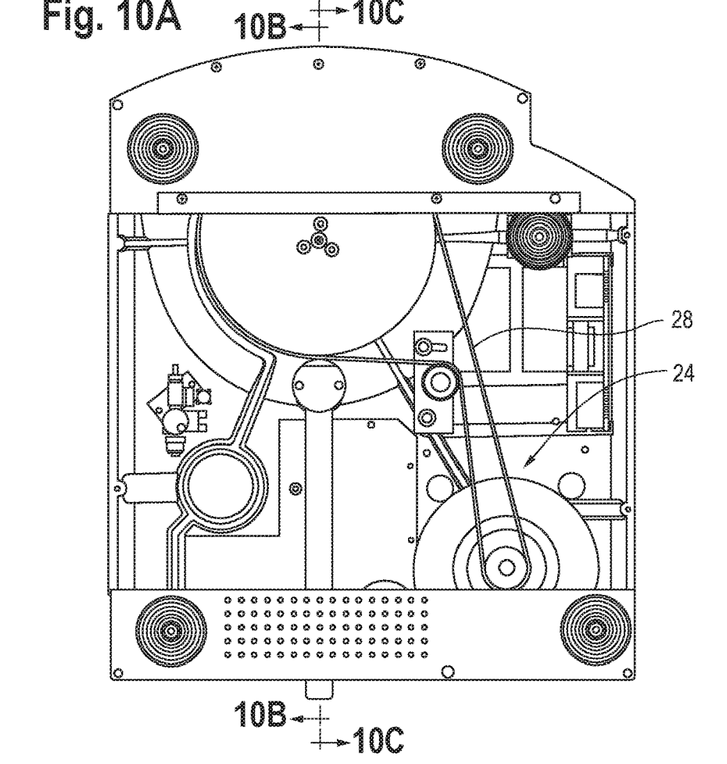
FIGS. 10A-10C are bottom and sectional views of the base, FIGS. 10B and 10C taken along lines 10B-10B and 10C-10C, respectively in FIG. 10A.
Figure 10B:
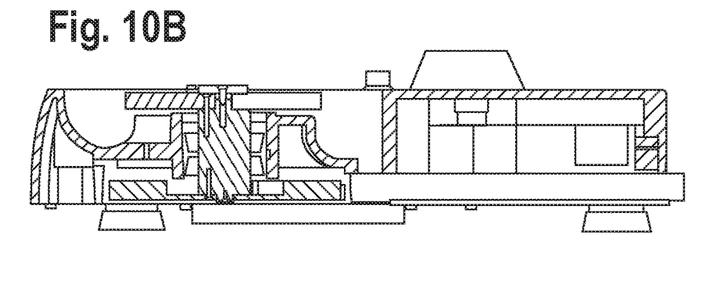
Figure 10C:
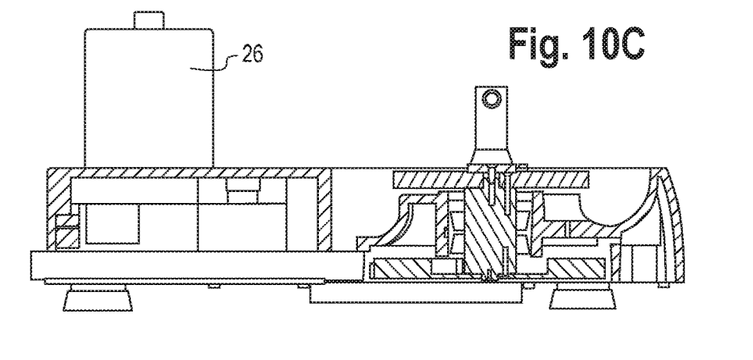
Figure 11:
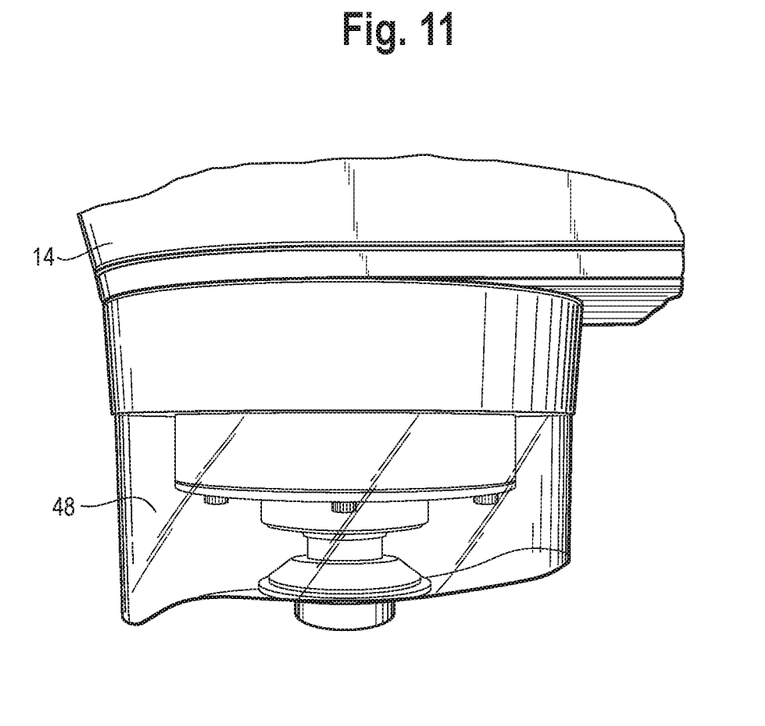
FIG. 11 illustrates the head and sleeve in the upper or retracted position.

Referring to FIG. 8, the rotational drive 80 is configured to rotate the specimen holder 46 in either a clockwise or counter clockwise direction. In a present grinder 10, the drive system 80 is a gear drive, driven by a motor 84, however, a direct drive, belt drive or the like can also be used. It will be understood that the head 14 is stationary as the specimen holder 46 rotational drive is operating. The drive system 80 includes a can-like housing 86 that has a gear 88 that engages a motor gear 90 to rotate the can-like housing 86.

Figure 6:
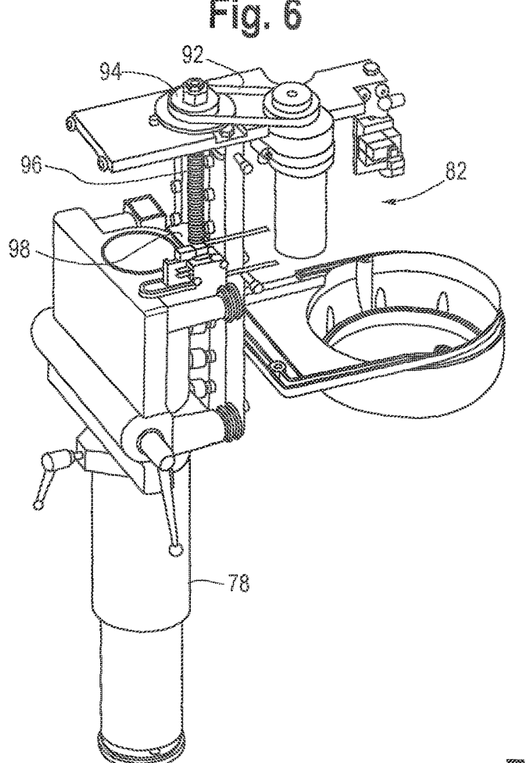
FIGS. 6 and 7 are partial perspective views of the head height drive assembly and having portions of the head removed for clarity of illustration
Figure 7:
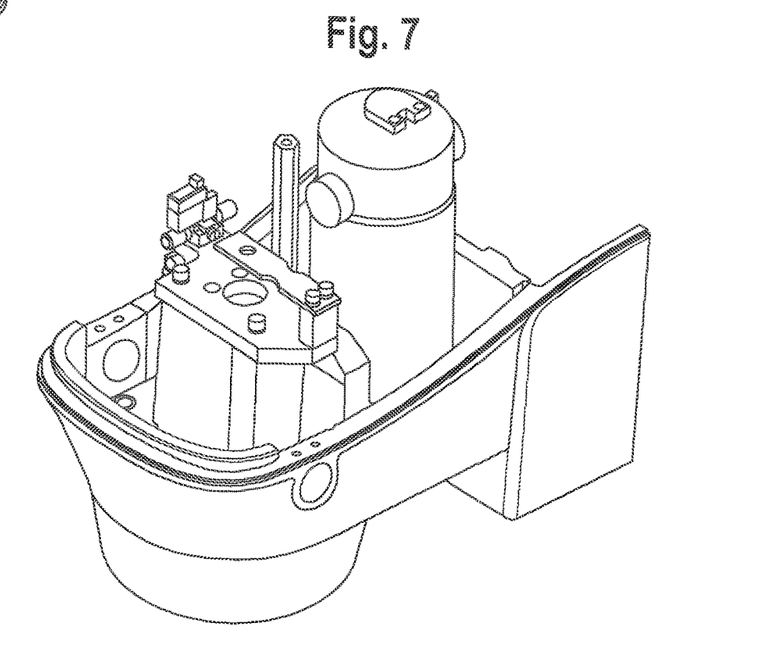

Referring to FIGS. 6-7, the height drive 82 is a precision drive to precisely position the specimen holder 46 and the specimens S relative to the wheel 34. The height drive 82 is fixedly mounted in the head 14. The present grinder 10 uses a servomotor that is operably connected by a timing belt 92 to a pulley 94 (driven by the belt 92). A lead screw 96 is mounted to the pulley 94 for rotation with the pulley 94. The lead screw 96 is mounted to a fixed (relative to the base 12 and the support 78) threaded receiving element 98 so that rotation of the lead screw 96 moves the head 14 up and down to move the specimen holder 46 toward and away from the wheel 34.

A further enhancement to the grinder 10 is an automated dressing system 100. As noted above, dressing is carried out to resurface or recondition the wheel 34 as the wheel 34 becomes worn, that is when the peaks on the abrasive are worn and the valleys between the peaks become filled with the specimen material (referred to as wheel loading). The dressing system 100 includes a head 102 mounted to an arm 104 that moves in an arc and contacts the wheel 34 to remove the loaded area (e.g., the worn and dulled areas or abrasive) and expose fresh surfaces of abrasive that more efficiently effect the grind. Dressing is carried out during the grinding operation by moving the arm 104 to swing over an opposite side of the wheel 34 from the location at which the grinding operation is carried out.

The dressing system head 102 has a hardened face 106 that contacts and removes the worn or dulled areas of the wheel 34. One hardened face is a sacrificial diamond dressing face 106. In the operation of known grinding systems, dressing is carried out at preset times, regardless of whether dressing is actually required or dressing is overdue. In the former instance, it will be appreciated that dressing too often removes portions of the wheel surface that are still effective for grinding. In the latter, overdue dressing can result in too much time spent grinding a sample or failure to properly grind. Moreover, the required dressing period is a function of many variables, such as specimen material, wheel composition, wheel speed, sample holder speed and the like.

In an embodiment of the present grinder 10, dressing is carried out based upon measured operating conditions and comparing those operating conditions to a preset value. One such way in which to dress the wheel 34 based on operating conditions is to measure the resistance between the specimen S and the grinding wheel 34 and to dress the grinding wheel 34 when the resistance drops below a certain preset value.

The resistance can be monitored in a variety of ways. In one embodiment, resistance is related to the amount of power required to operate either the platen motor 26 or the head motor 84 (the two concurrently rotating elements). The power is related to the current drawn by the motors 26, 84. So, in application, one way in which to measure the resistance is to monitor the current drawn by with the platen motor 26 or the head motor 84. When the current drops below a certain predetermined level, it is indicative of lowered resistance and dressing will automatically commence.

Figure 16:
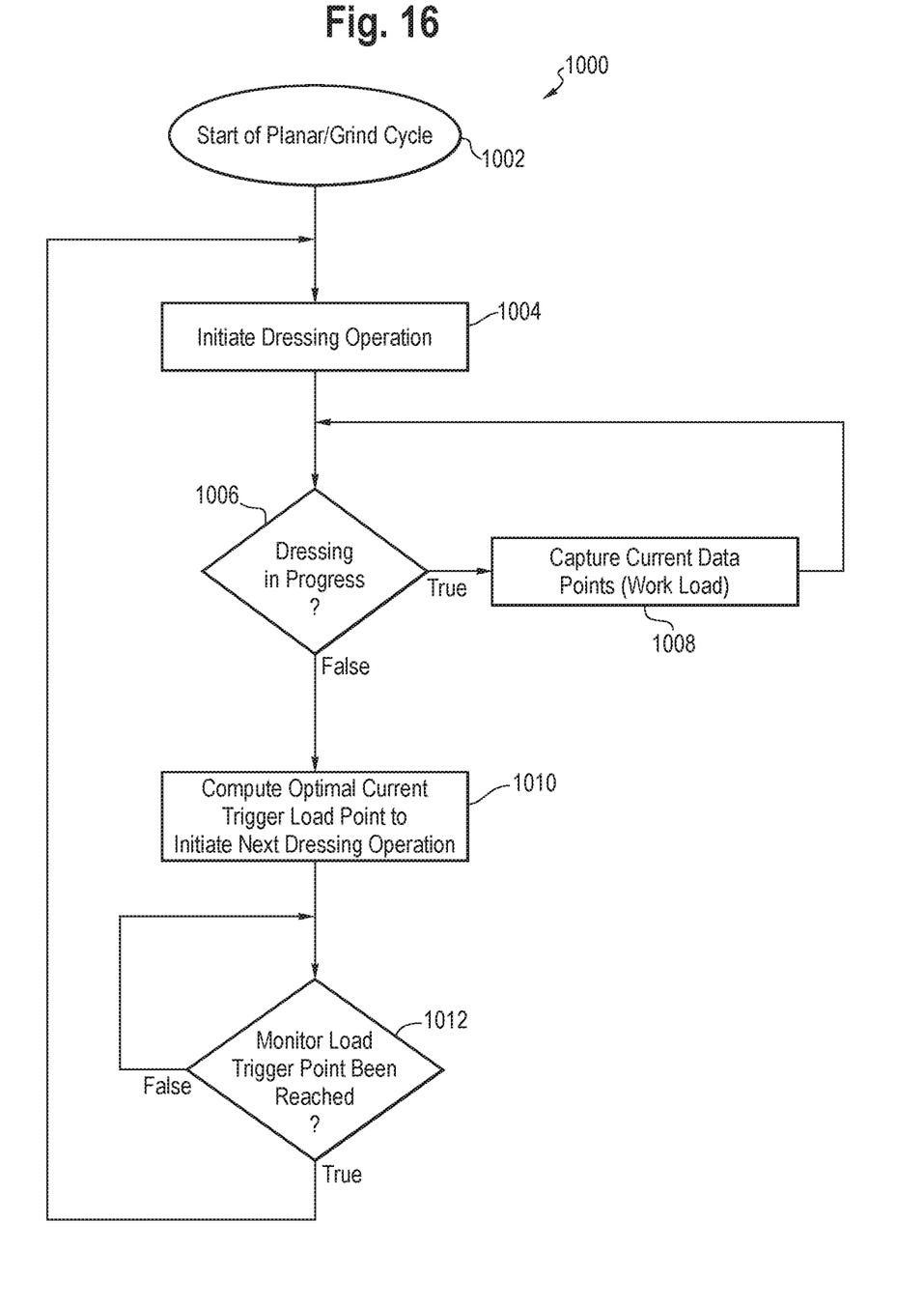
FIG. 16 is an example of an operating scheme for the planar grinder.

A flow chart of the automated dressing operation 1000 is illustrated in FIG. 16. At step 1002, the grinder cycle commences and at step 1004, a dressing operation is initiated. At step 1006, the controller monitors whether a dressing operation is in progress.

If a dressing operation is in progress, then at step 1008, the (electrical) current data points (work load on the motor) are captured and stored in the controller and the operation returns to between steps 1004 and 1006.

If a dressing operation is not in progress, then at step 1010, the controller determines the optimal current trigger point to initiate the next dressing operation. The controller monitors whether the current load has reached a load trigger point at step 1012. And, if the trigger point has been reached, the controller initiates a dressing operation at step 1004. If the trigger point has not been reached, the controller continues to monitor whether the current load reaches the load trigger point at step 1012.

In this manner, the dressing operation is initiated only when needed based on actual operating data (data as captured through monitoring the current load on the platen or the head motor), rather than on an arbitrary, time-based measurement. This feature provides an optimal work load with a minimized cycle time.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the invention.

What is claimed is:

1. A sample grinder, comprising:
   a base having a bowl and a rotatable drive plate to operably support a grinding wheel;
   a head configured to support a specimen holder and having a first drive for rotational drive of the specimen holder, the head having a second drive for moving the head and the specimen holder toward and away from the rotatable drive plate, the head having a depending sleeve having inner and outer peripheries, the inner periphery being larger than an outer periphery of the specimen holder; and
   a cover disposed over the bowl and the rotatable drive plate, the cover having an opening having an inner periphery greater than the outer periphery of the sleeve, wherein the sleeve traverses through the cover opening when the specimen holder is moved toward the rotatable drive plate.

2. The sample grinder of claim 1, wherein the cover has a top, the top being non-planar and sloping away toward a front-side corner thereof.

3. The sample grinder of claim 1, wherein the sleeve is formed, at least in part, from a transparent or semi-transparent material.

4. The sample grinder of claim 1, wherein the cover includes a fluid delivery manifold and a plurality of fluid dispensing nozzles in fluid communication with the fluid delivery manifold.

5. The sample grinder of claim 4, wherein the fluid delivery manifold is formed as part of the cover and wherein the fluid dispensing nozzles are mounted to the cover over the fluid delivery manifold.

6. The sample grinder of claim 5, wherein the fluid dispensing nozzles are formed as openings in a plate and wherein the plate is mounted to an inside surface of the cover.

7. The sample grinder of claim 6, wherein the openings in the plate are asymmetrically disposed generally along a line of the plate.

8. The sample grinder of claim 5, further comprising a fluid delivery conduit in the base in fluid communication with the fluid delivery manifold.

9. The sample grinder of claim 1, wherein the cover is removable from the base.

10. The sample grinder of claim 9, wherein the cover is secured to the base when in a secured position and is removable from the base when in an unsecured position, wherein the cover is removable from the base without the use of tools.

11. A grinder, comprising:
    a base having a bowl and a rotatable drive plate that is configured to support a grinding wheel;
    a head configured to support a specimen holder via a shaft,
       wherein the head includes a first drive configured to rotate the specimen holder and a second drive configured to move the specimen holder toward and away from the rotatable drive plate, and
       wherein the head includes a sleeve configured to surround at least a portion of the shaft, wherein the sleeve defines an inner periphery and an outer periphery; and
    a cover disposed over the bowl and the rotatable drive plate,
       wherein cover defines an opening having an inner periphery that is greater than an outer periphery of the sleeve, and
       wherein the sleeve is configured to pass at least partially through the cover opening when the specimen holder is moved toward the rotatable drive plate.

12. The grinder of claim 11, wherein the cover has a top that is non-planar and sloping away toward a front-side corner thereof.

13. The grinder of claim 11, wherein the sleeve is formed, at least in part, from a transparent or semi-transparent material.

14. The grinder of claim 11, wherein the cover includes a fluid delivery manifold and a plurality of fluid dispensing nozzles in fluid communication with the fluid delivery manifold.

15. The grinder of claim 14, wherein the fluid delivery manifold is formed as part of the cover and wherein the fluid dispensing nozzles are mounted to the cover over the fluid delivery manifold.

16. The grinder of claim 15, wherein the fluid dispensing nozzles are formed as openings in a plate and wherein the plate is mounted to an inside surface of the cover.

17. The grinder of claim 16, wherein the openings in the plate are asymmetrically disposed generally along a line of the plate.

18. The grinder of claim 15, further comprising a fluid delivery conduit in the base that is in fluid communication with the fluid delivery manifold.

19. The grinder of claim 11, wherein the cover is removable from the base.

20. The grinder of claim 19, wherein the cover is secured to the base when in a secured position and is removable from the base when in an unsecured position, wherein the cover is removable from the base without use of tools.

* * * * *